W. H. BRISTOL.
SCREW FASTENING DEVICE.
APPLICATION FILED MAR. 10, 1914.
1,106,342. Patented Aug. 4, 1914.
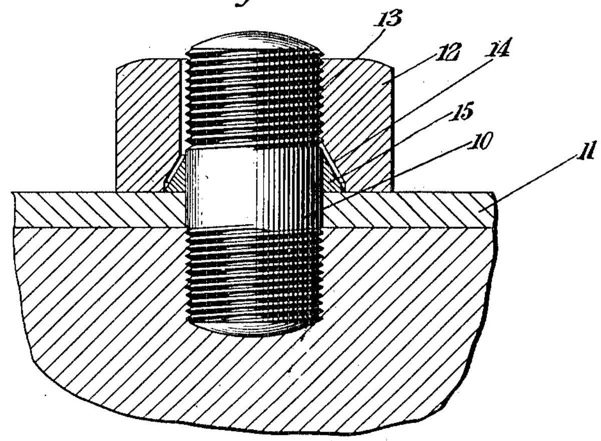
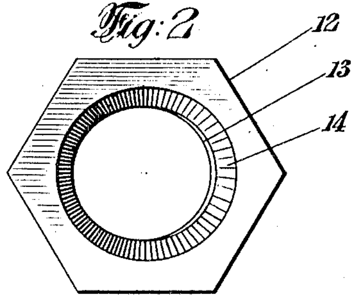
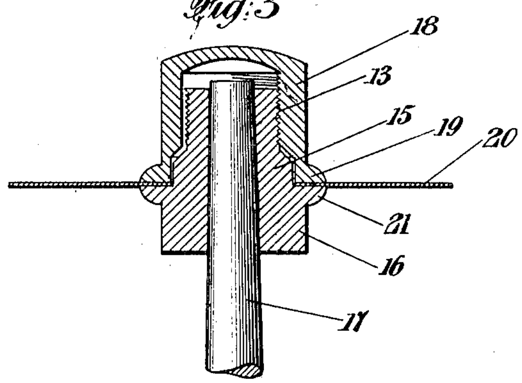
Witnesses:
John E. Prager
A. Worden Gibbs
Inventor
William H. Bristol
By his Attorney
Frank F. Schuetz

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

SCREW-FASTENING DEVICE.

1,106,342. Specification of Letters Patent. Patented Aug. 4, 1914.

Application filed March 10, 1914. Serial No. 823,671.

*To all whom it may concern:*

Be it known that I, William H. Bristol, a citizen of the United States, and a resident of Waterbury, in the county of New Haven and State of Connecticut, have invented certain new and useful Improvements in Screw-Fastening Devices, of which the following is a specification.

The invention relates to improvements in screw fastening devices, more particularly of the nature of a bolt or the like and nut adapted to coact therewith.

It has for its object to enable the nut to be more quickly drawn against an abutment or object to be held than has heretofore been the case, in that the screwing on of the said nut throughout the entire projecting threaded portion of the bolt is rendered unnecessary.

The nature of the invention will be best understood when described in connection with the accompanying drawings, in which—

Figure 1 illustrates in vertical section one embodiment of the improved fastening means. Fig. 2 is an underneath view of the nut shown in Fig. 1. Fig. 3 is a vertical section illustrating the invention as employed in the retaining of a record chart of recording gages and the like.

Similar characters of reference designate corresponding parts throughout the several views.

Referring to the drawings, 10 designates a stud which is shown inserted in place to hold a plate 11 or the like and provided with threads of usual and standard design. This particular portion of the fastening device, be it stud, bolt or other threaded member adapted to receive a nut or the like, is generally in no wise changed from those commonly employed for similar purposes. The nut 12, however, which is adapted to fit over the projecting and threaded portion has its threads extending but partly around its interior, affording thereby a larger internal diameter than would be required ordinarily for the corresponding bolt. The said greater diameter may be obtained, for example, by reboring the nut eccentrically after the same has been tapped as for ordinary purposes. This, of course, removes a certain portion of the thread of the nut so that merely a portion 13 of the original thread remains. The internal diameter of said nut being thus somewhat greater than the diameter of bolt 10, the said nut may be dropped thereover without any engagement of the threads of both being effected, and the nut quickly brought to its holding position. To effect engagement of the threads for the purpose of bringing the nut into a securing position, it is necessary to center the same relatively to its bolt. The nut, for this purpose, is further counterbored at its inner end to provide an outwardly flaring portion 14, preferably conical to effect a gradual and easy centering upon an annular centering member or washer 15 which is adapted to be slipped over the bolt 10 and of a contour substantially similar to that of the inner end of the nut 12. The outwardly flaring portion of the inner diameter of said nut is, furthermore, near the inner face of the nut made cylindrical to assist in the centering and to enable the nut to be screwed down firmly without binding upon member 15.

In Fig. 3, a threaded member 16 such as is employed in recording gages is held by a taper fit upon a rotatable arbor 17 of the gage (not shown); and the centering member 15, of the form illustrated in Fig. 1, is made integral with the said threaded member 16. The nut is in the form of a cap 18 with a flange 19 adapted to bear down upon a chart 20 to hold the same to a similar flange 21 of the member 16. In thus having the nut to afford an opening larger than ordinarily required and in providing means in proximity to an abutment or object to be held whereby the said nut may be properly centered to effect engagement of its threads with those of the bolt upon which it is fitted, it becomes possible to draw it very quickly and readily against such abutment or object to be held, as it is necessary merely to drop the nut over its bolt until the centering member comes into action and to then give it a partial turn. It is evident, of course, that the construction might be reversed, but it is preferred to increase the opening in the nut rather than decrease the diameter of the bolt.

I claim:—

1. A screw fastening device including a threaded bolt and a threaded nut therefor of larger opening than said bolt, the threads of one of which extend but partly around the same, and means to center said nut with respect to said bolt.

2. A screw fastening device including a threaded bolt, a partly threaded nut of larger opening than said bolt and adapted to fit thereover, and means to center said nut with respect to said bolt.

3. A screw fastening device including a threaded bolt, a nut having an eccentric, threaded opening larger than said bolt and adapted to fit thereover, and means to center said nut with respect to said bolt.

4. A screw fastening device including a threaded bolt, a nut having an eccentric, suitably threaded opening larger than said bolt flaring outwardly at the inner end and adapted to fit thereover, and means to center said nut with respect to said bolt.

5. A screw fastening device including a threaded bolt, a partly threaded nut of larger opening than said bolt and adapted to fit thereover, said opening flaring outwardly and at its immediate inner end being parallel to the said bolt, and means to center said nut with respect to said bolt.

6. A screw fastening device including a threaded member provided with a holding flange and of larger diameter immediately above said holding flange and tapering therefrom to its threaded portion, and a nut whose threads extend but partly around the same, said nut having an eccentric opening and adapted to fit over the said threaded member.

7. A screw fastening device including a threaded member provided with a holding flange and of larger diameter immediately above said holding flange and tapering therefrom to its threaded portion, and a cap having an eccentric interior with threads extending but partly around the same, said interior flaring outwardly at the inner end correspondingly to the said tapered portion of the threaded member and about which the cap is adapted to be fitted.

8. A screw fastening device including a threaded member and a second threaded member to fit thereon and of larger opening than said first-named member, the threads of one of said members extending but partly around the same, and means to center said members with respect to each other.

Signed at New York, in the county of New York, and State of New York, this 7th day of March, A. D. 1914.

WILLIAM H. BRISTOL.

Witnesses:
FREDK. F. SCHUETZ,
LAURA E. SMITH.